United States Patent
Deki et al.

(10) Patent No.: US 8,879,180 B2
(45) Date of Patent: Nov. 4, 2014

(54) SYSTEM, METHOD AND APPARATUS FOR DATA TRACK USAGE SEQUENCE TO REDUCE ADJACENT TRACK INTERFERENCE EFFECT

(71) Applicant: HGST Netherlands B.V., Amsterdam (NL)

(72) Inventors: Hiroshi Deki, Kanagawa (JP); Takayuki Kinoshita, Kanagawa (JP)

(73) Assignee: HGST Netherlands B.V., Amsterdam (NL)

( * ) Notice: Subject to any disclaimer, the term of this patent is extended or adjusted under 35 U.S.C. 154(b) by 29 days.

(21) Appl. No.: 13/712,057

(22) Filed: Dec. 12, 2012

(65) Prior Publication Data
US 2014/0160589 A1    Jun. 12, 2014

(51) Int. Cl.
*G11B 5/02*    (2006.01)
*G11B 27/36*    (2006.01)

(52) U.S. Cl.
CPC ..................... *G11B 27/36* (2013.01)
USPC .................... 360/31; 360/45; 360/48; 360/71

(58) Field of Classification Search
CPC ............ G11B 5/012; G11B 5/82; G11B 5/02; G11B 5/54; G11B 19/041; G11B 20/12; G11B 20/1217; G11B 20/10212
USPC ..................... 360/45, 55, 48, 71, 72.1, 75, 31
See application file for complete search history.

(56) References Cited

U.S. PATENT DOCUMENTS

| | | | |
|---|---|---|---|
| 5,031,168 A | 7/1991 | Moore | |
| 5,367,652 A * | 11/1994 | Golden et al. | 711/4 |
| 5,600,500 A | 2/1997 | Madsen et al. | |
| 5,655,074 A | 8/1997 | Rauscher | |
| 5,901,003 A | 5/1999 | Chainer et al. | |
| 5,991,115 A | 11/1999 | Chainer et al. | |
| 6,178,054 B1 * | 1/2001 | Wakefield | 360/31 |
| 6,262,857 B1 * | 7/2001 | Hull et al. | 360/51 |
| 6,320,718 B1 | 11/2001 | Bouwkamp et al. | |
| 6,826,140 B2 | 11/2004 | Brommer et al. | |
| 7,020,808 B2 | 3/2006 | Sato et al. | |
| 7,062,685 B1 | 6/2006 | Plofsky et al. | |
| 7,102,838 B2 * | 9/2006 | Kim et al. | 360/31 |
| 7,253,986 B2 | 8/2007 | Berman et al. | |
| 7,369,339 B2 * | 5/2008 | Kojima et al. | 360/31 |
| 7,428,120 B2 | 9/2008 | Berman et al. | |
| 7,463,441 B2 | 12/2008 | Cho et al. | |
| 7,733,589 B2 * | 6/2010 | Wada et al. | 360/48 |
| 7,747,907 B2 | 6/2010 | Olds et al. | |

(Continued)

FOREIGN PATENT DOCUMENTS

WO    2012058478 A1    5/2012

*Primary Examiner* — Thomas Alunkal
(74) *Attorney, Agent, or Firm* — Abel Law Group, LLP.

(57) ABSTRACT

Storing data in a hard disk drive may include determining a percentage of storage usage (SU %) of the data tracks. If the SU % is less than a first threshold percentage (TP1), the method may include storing data to Nth data tracks. If the SU % is greater than or equal to TP1, but less than a second threshold percentage (TP2), the method may include storing data to about N/2 data tracks between said Nth data tracks. If the SU % is greater than or equal to TP2, the method may include storing data to data tracks between said N/2 data tracks and said Nth data tracks.

30 Claims, 3 Drawing Sheets

(56) References Cited

U.S. PATENT DOCUMENTS

| | | |
|---|---|---|
| 7,920,352 B2 | 4/2011 | Inoue et al. |
| 8,014,097 B1 * | 9/2011 | Sanvido .................. 360/60 |
| 8,190,837 B2 | 5/2012 | McLeod et al. |
| 8,316,263 B1 | 11/2012 | Gough et al. |
| 2003/0133217 A1 | 7/2003 | Nunnelley |
| 2005/0264930 A1 | 12/2005 | Gider et al. |
| 2008/0256397 A1 | 10/2008 | Smith |
| 2009/0290245 A1 | 11/2009 | Motoki |
| 2010/0149681 A1 * | 6/2010 | Masuyama .................. 360/75 |
| 2010/0251039 A1 | 9/2010 | Hirohata et al. |
| 2011/0047322 A1 | 2/2011 | Allen et al. |
| 2011/0075290 A1 | 3/2011 | Hobbet |
| 2011/0162073 A1 | 6/2011 | Jeschke et al. |
| 2012/0014013 A1 | 1/2012 | Bandic et al. |
| 2013/0013964 A1 | 1/2013 | Hirohata et al. |
| 2013/0027800 A1 * | 1/2013 | Park et al. .................. 360/31 |
| 2013/0085917 A1 | 4/2013 | Agarwal et al. |
| 2013/0253979 A1 | 9/2013 | Williams et al. |

* cited by examiner

SYSTEM, METHOD AND APPARATUS FOR DATA TRACK USAGE SEQUENCE TO REDUCE ADJACENT TRACK INTERFERENCE EFFECT

BACKGROUND OF THE INVENTION

1. Field of the Disclosure

The present invention relates in general to disk drives and, in particular, to a system, method and apparatus for sequences of data track usage to reduce the effect of adjacent track interference.

2. Description of the Related Art

Increased magnetic disk recording density has been accompanied by further narrowing of the track pitch. When data is recorded on a particular data track of a magnetic hard disk drive (HDD), a phenomenon in which magnetic flux that has leaked from the recording head (e.g., a fringe field) affects the data that has been recorded on adjacent data tracks and far tracks. When the recorded data has been updated many times, the data that has been recorded on the adjacent data tracks and far tracks can be corrupted and have errors. Errors that can be recovered from error correction codes (ECC) are called soft read errors. However, readback of these tracks may not be recoverable from the ECC.

For adjacent tracks, this non-recovery phenomenon is known as adjacent track interference (ATI). For far tracks, this phenomenon is known as far track erasure or far track interference (FTI). Depending on the design of the write head, both ATI/FTI-refresh and FTI effects (ATI/FTI) occur during the write of a particular data track. Manufacturing tolerances for the write head and magnetic media may affect the ATI/FTI impact on the various head-media interfaces in a single HDD.

The write head is mounted to a rotary actuator such that its movement is arcuate in shape from the inner diameter of the disk to the outer diameter of the disk. Thus, geometry also may alter the impact of ATI/FTI. Since the head moves above the magnetic disk in accordance with the tracks, a skew angle is defined between a tangent of a data track on the disk and the direction of the head.

After data writing has been performed a certain number of times on an adjacent data track, ATI/FTI may be prevented by a process of reading and write-back of the data track. This process is referred to as ATI/FTI-Refresh. To determine when an ATI/FTI-Refresh is to be performed, a Risk-Counter may be used to indicate the extent of the ATI/FTI degradation for each data track. The Risk-Counter may be updated in response to the writes of adjacent or far data tracks. When the Risk-Counter of a data track exceeds a Risk-Threshold, the ATI/FTI-Refresh is performed on that data track.

User data may be written on the disk in data blocks of, for example, 512 bytes or 4 kilobytes. These data blocks employ data encoding techniques and ECC to recover data that, when read back, includes bits in error. The data encoding and ECC have limitations in the number of bit errors that can be corrected by the electronics of the HDD. If there are too many bits in error, not all data bits can be recovered and the data block is considered unrecoverable. Thus, if the ATI/FTI degradation is too far along then the data block in a data track may be unrecoverable. The ATI/FTI-Refresh is intended to alert the HDD electronics before the degradation has progressed too far. When the Risk-Threshold has been exceeded for a data track, that data track is read back, any soft data errors are corrected using the data encoding and ECC, then the corrected user data is written back to the disk at the same track location.

Because the relevant data is read out of the entire circumference of the data track and rewritten on the data track in an ATI/FTI-Refresh, commands from the host computer to which the HDD is coupled cannot be processed during that period. Consequently, the performance of the HDD is degraded during these periods.

SUMMARY

Embodiments of a system, method and apparatus for certain types of sequences of storing data in hard disk drive are disclosed. Such sequences of data track usage can reduce the effects of ATI and FTI. A media disk may have a plurality of data tracks with a range of user storage usage from 0% to 100%. Initially, the method may include determining a percentage of user storage usage (SU %) of the data tracks in the range of user storage usage. If the SU % is less than about 25%, the method may include storing user data to fourth data tracks in the radial array. If the SU % is greater than or equal to about 25%, but less than about 50%, some embodiments of the method may include storing user data to second data tracks between said fourth data tracks in the radial array. If the SU % is greater than or equal to about 50%, some embodiments of the method may include storing user data to data tracks between said second data tracks and said fourth data tracks in the radial array.

Other embodiments may include determining a percentage of storage usage (SU %) of the data tracks. If the SU % is less than a first threshold percentage (TP1), the method may include storing data to Nth data tracks. If the SU % is greater than or equal to TP1, but less than a second threshold percentage (TP2), the method may include storing data to about N/2 data tracks between said Nth data tracks. If the SU % is greater than or equal to TP2, the method may include storing data to data tracks between said N/2 data tracks and said Nth data tracks.

Embodiments of a system for controlling data storage in a hard disk drive may comprise an enclosure and a media disk rotatably mounted to the enclosure. The media disk can have data tracks for storing data. An actuator may be movably mounted to the enclosure and have a slider for reading data from and writing data to the data tracks. An operating system (OS) for controlling the disk drive may be provided. Embodiments of the OS can determine a percentage of storage usage (SU %) of the data tracks; wherein, if the SU % is less than a first threshold percentage (TP1), the OS can store data to Nth data tracks; if the SU % is greater than or equal to TP1, but less than a second threshold percentage (TP2), the OS can store data to about N/2 data tracks between said Nth data tracks; and if the SU % is greater than or equal to TP2, the OS can store data to data tracks between said about N/2 data tracks and said Nth data tracks.

The foregoing and other objects and advantages of these embodiments will be apparent to those of ordinary skill in the art in view of the following detailed description, taken in conjunction with the appended claims and the accompanying drawings.

BRIEF DESCRIPTION OF THE DRAWINGS

So that the manner in which the features and advantages of the embodiments are attained and can be understood in more detail, a more particular description may be had by reference to the embodiments thereof that are illustrated in the appended drawings. However, the drawings illustrate only

The use of the same reference symbols in different drawings indicates similar or identical items.

DETAILED DESCRIPTION

Figure 1:
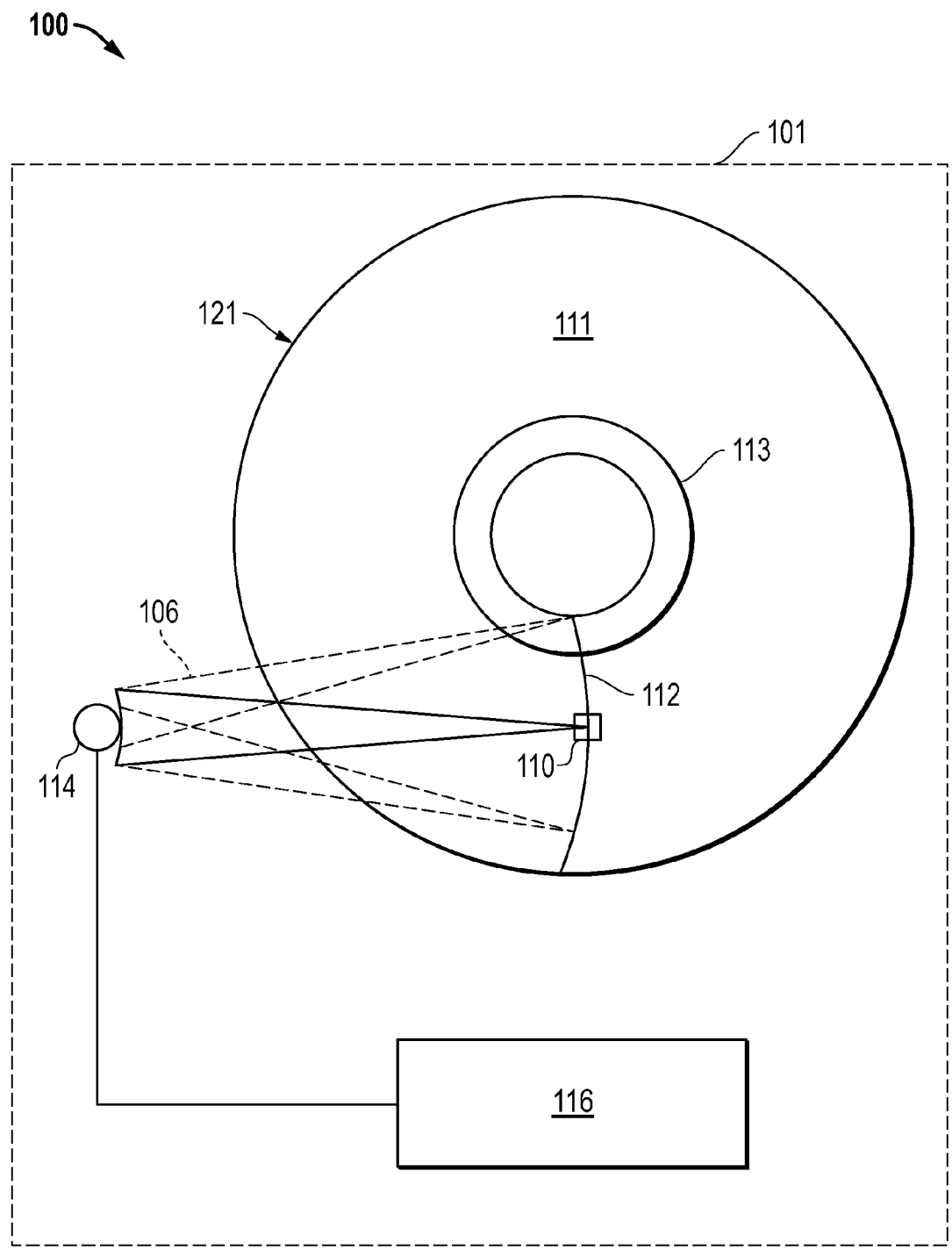
FIG. 1 is a schematic diagram of an embodiment of a disk drive.

FIG. 1 depicts an embodiment of a hard disk drive assembly 100 comprising a housing or enclosure 101 with one or more media disks 111 (as described herein) rotatably mounted thereto. The system, method and apparatus described herein may be readily incorporated into hard disk drive assembly 100. The disk 111 comprises magnetic recording media rotated at high speeds by a spindle motor (not shown) during operation. Disk 111 may be configured, manufactured and fabricated as described elsewhere herein.

Magnetic data tracks 113, which may be concentric, are formed on either or both of the disk surfaces to receive and store information. The tracks are formed by the creation of bit-patterned islands with one magnetic property which are surrounded by material with a different magnetic property.

A write head is used to direct the magnetic state of the magnetic bits to one of two directions to write data. The resting state of the magnetization of the bit can be pointed perpendicular to the plane of the disk. A read head is used to detect which direction the magnetization is pointed in. Typically the read and write heads are integrated on a single slider and the slider is attached to a suspension which is rotated to different radii on the disk to read and write information from various tracks. The read head is also uses to control servo positioning of the head.

Embodiments of a read/write slider 110 having read/write heads may be moved across the disk surface by an actuator assembly 106, allowing the slider 110 to read and/or write magnetic data to a particular track 113. The actuator assembly 106 may pivot on a pivot 114 or by a linear actuator. The actuator assembly 106 may form part of a closed loop feedback system, known as servo control, which dynamically positions the read/write slider 110 to compensate for thermal expansion of the magnetic recording media 111 as well as vibrations and other disturbances or irregularities. Also involved in the servo control system is a complex computational algorithm executed by a microprocessor, digital signal processor, or analog signal processor 116 that receives data address information from a computer, converts it to a location on the disk 111, and moves the read/write slider 110 accordingly.

In some embodiments of hard disk drive systems, read/write sliders 110 periodically reference servo patterns recorded on the disk to ensure accurate slider positioning. Servo patterns may be used to ensure a read/write slider 110 follows a particular track 113 accurately, and to control and monitor transition of the slider 110 from one track to another. Upon referencing a servo pattern, the read/write slider 110 obtains head position information that enables the control circuitry 116 to subsequently realign the slider 110 to correct any detected error.

Servo patterns or servo sectors may be contained in engineered servo sections 112 that are embedded within a plurality of data tracks 113 to allow frequent sampling of the servo patterns for improved disk drive performance, in some embodiments. In a typical magnetic recording media 111, embedded servo sections 112 may extend substantially radially from the center of the magnetic recording media 111, like spokes from the center of a wheel. The servo features may be similarly sized to the data features or may be larger. The size of the features is determined by the mask pattern. Unlike spokes however, servo sections 112 form a subtle, arc-shaped path calibrated to substantially match the range of motion of the read/write slider 110. Both sides of the disk can be patterned.

Figure 2:
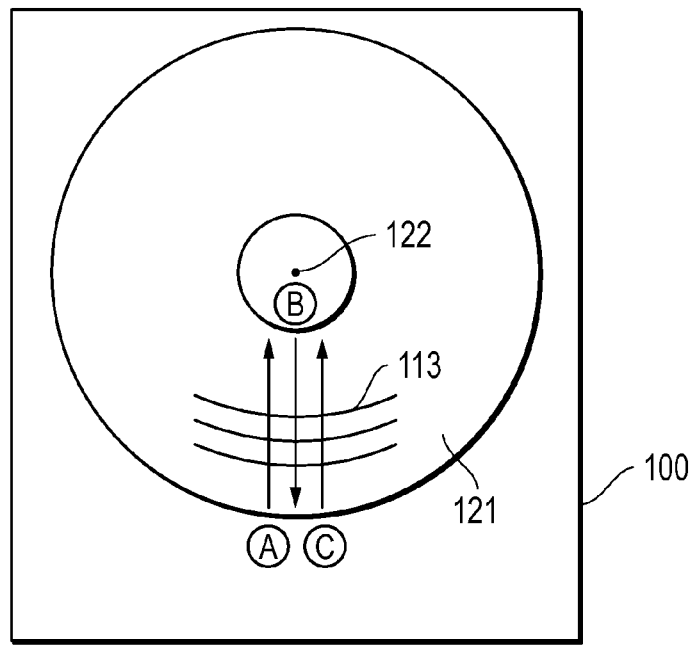
FIG. 2 is a schematic top view of a media disk illustrating embodiments of a method of storing data in a disk drive.

Embodiments of a system, method and apparatus of some types of sequences of storing data in hard disk drive assembly 100 also are disclosed. Such sequences of data track usage can reduce the effects of ATI and FTI. Depending on the application, the method may be adapted for storing user-stored data in a hard disk drive. For example, as shown in FIG. 2, one embodiment of such a method may comprise providing a media disk 121 with a plurality of data tracks 113. The media disk 121 may have a rotational axis 122 and a plurality of data tracks 113 in a radial array with respect to the rotational axis 122. The directions of the arrows in FIGS. 2 and 3 are merely used to illustrate some embodiments, and are not intended to limit the scope of the invention in any way.

Figure 3A:
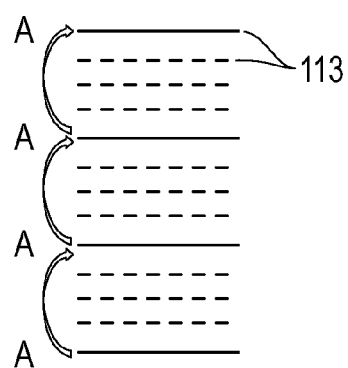
FIGS. 3A-3C are schematic diagrams depicting some details of embodiments of storing data in a disk drive.

The data tracks may have a range of user storage usage from 0% to 100%. Initially, the method may include determining a percentage of user storage usage (SU %) of the data tracks in the range of user storage usage. As depicted by line A in FIG. 2 and as shown in FIG. 3A, if the SU % is less than about 25%, the method may include storing user data to fourth data tracks A in the radial array of data tracks 113. For example, if the percentage of user storage usage is less than about 25%, the method may comprise storing user data only to every fourth data track A in the radial array of data tracks 113. In some embodiments, if the percentage of user storage usage is less than about 25%, all data tracks with user stored data have at least 3 empty data tracks therebetween.

Figure 3B:
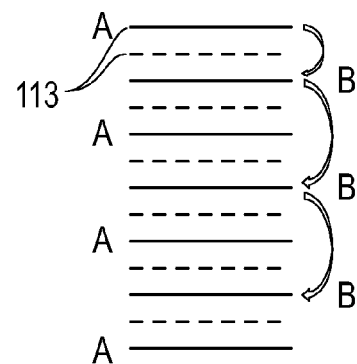

As depicted by line B in FIG. 2 and as shown in FIG. 3B, if the SU % is greater than or equal to about 25%, but less than about 50%, some embodiments of the method may include storing user data to second data tracks B between said fourth data tracks A in the radial array of data tracks 113. In some versions, if the percentage of user storage usage is greater than or equal to about 25%, but less than about 50%, the method may comprise storing user data only to every second data track B between every fourth data track A in the radial array of data tracks 113. In some embodiments, if the percentage of user storage usage is greater than or equal to about 25%, but less than about 50%, all data tracks with user stored data have at least 1 empty data track therebetween.

Figure 3C:
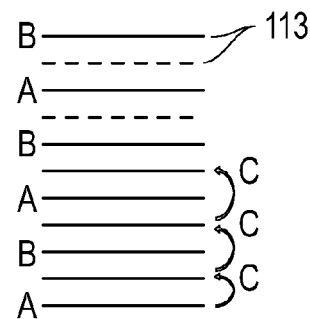

As depicted by line C in FIG. 2 and as shown in FIG. 3C, if the SU % is greater than or equal to about 50%, some embodiments of the method may include storing user data to data tracks C between said second data tracks B and said fourth data tracks A in the radial array of data tracks 113. In certain embodiments, if the percentage of user storage usage is greater than or equal to about 50%, the method may comprise storing user data only to the data tracks C between the second data tracks B and the fourth data tracks A in the radial array of data tracks 113. For example, if the percentage of user storage usage is greater than or equal to about 50%, only some data tracks with user stored data have at least 1 empty data track therebetween.

In still other embodiments of the method, the various thresholds for the selection and distribution of data track storage could be even more sophisticated or less sophisticated. For example, if the percentage of user storage usage is less than about 20%, storing user data only to every fifth data track in the radial array, such that all data tracks with user stored data have at least 4 empty data tracks therebetween. Still other examples could set the initial threshold at 10% so that data is stored to every tenth track. The initial threshold could be 5% so that data is stored to every 20$^{th}$ track, or even at 1% so that data is initially stored to every 100$^{th}$ track.

Some embodiments of the method may include determining a percentage of storage usage (SU %) of the data tracks. In addition, and as schematically depicted by line A in FIG. 2, if the SU % is less than a first threshold percentage (TP1), the method may include storing data to Nth data tracks. For example, if the SU % is less than TP1, the method may include storing data only to every Nth data track. In some embodiments, if the SU % is less than TP1, all data tracks with stored data have at least N−1 empty data tracks therebetween.

As depicted by line B, if the SU % is greater than or equal to TP1, but less than a second threshold percentage (TP2), the method may include storing data to about N/2 data tracks between said Nth data tracks. In other examples, if the SU % is greater than or equal to TP1, but less than TP2, the method may include storing data only to about every N/2 data track between every Nth data track. For example, if the SU % is greater than or equal to TP1, but less than TP2, all data tracks with stored data have at least (N/2−1) empty data tracks therebetween.

The actual data tracks selected for storage may vary depending on whether an even number or odd number of data tracks are available. In some embodiments, if the SU % is greater than or equal to TP2, the method may include storing data to data tracks between said N/2 data tracks and said Nth data tracks. For example, if the SU % is greater than or equal to TP2, the method may include storing data only to the data tracks between the N/2 data tracks and the Nth data tracks. In some versions, if the SU % is greater than or equal to TP2, only some data tracks with stored data have at least 1 empty data track therebetween.

The data tracks may be those limited to user data storage. In some examples, the SU % can be the percentage of usage of user-stored data stored in the data tracks limited to user data storage.

Figure 4:
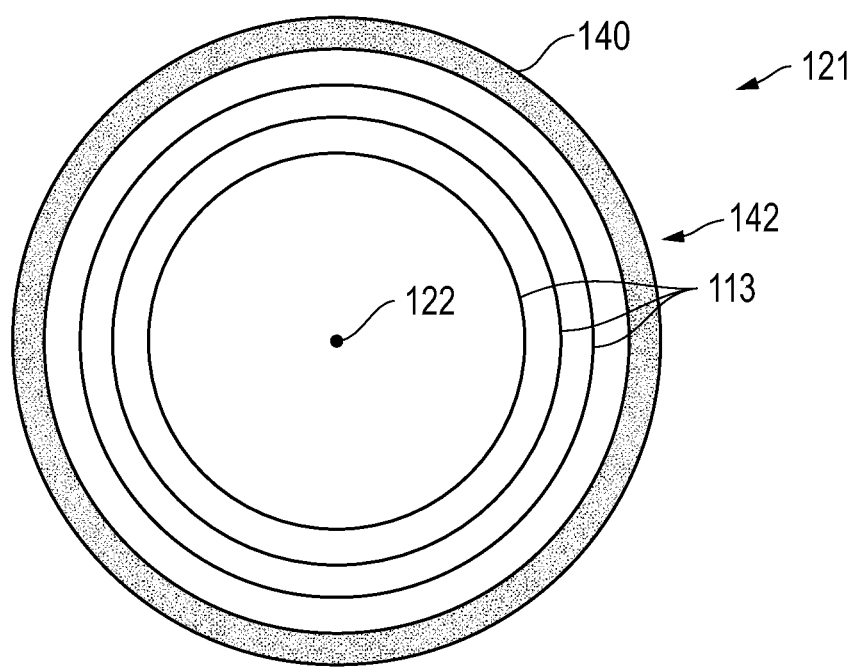
FIG. 4 is a schematic plan view of another embodiment of a media disk.

Referring now to FIG. 4, the media disk 121 may further comprise other data tracks (ODTs) 140 located among the data tracks 113. For example, the ODTs 140 may comprise read-only data tracks for non-user data storage. In these versions, data may be stored away from the ODTs in accordance with the various combinations of steps set forth herein. Such configurations help protect the data stored in the ODTs. As shown in the embodiment of FIG. 4, the ODTs 140 may be located along (e.g., adjacent to) the outer perimeter 142 of the media disk 121. Depending on the application, however, the ODTs may be located anywhere else on the media disk that the data tracks are desired. Moreover, the ODTs may be located together, or may be divided into multiple sections that are not co-located together.

Embodiments of a system for controlling data storage in a hard disk drive may comprise an enclosure and a media disk rotatably mounted to the enclosure. The media disk can have data tracks for storing data. An actuator may be movably mounted to the enclosure and have a slider for reading data from and writing data to the data tracks. An operating system (OS) for controlling the disk drive may be provided. Embodiments of the OS can determine a percentage of storage usage (SU %) of the data tracks; wherein, if the SU % is less than a first threshold percentage (TP1), the OS can store data to Nth data tracks; if the SU % is greater than or equal to TP1, but less than a second threshold percentage (TP2), the OS can store data to about N/2 data tracks between said Nth data tracks; and if the SU % is greater than or equal to TP2, the OS can store data to data tracks between said about N/2 data tracks and said Nth data tracks.

The system may include embodiments wherein the data tracks are those limited to user data storage, and SU % can be the percentage of usage of user-stored data stored in the data tracks limited to user data storage. If the SU % is less than TP1, the OS can store data only to every Nth data track. If the SU % is less than TP1, all data tracks with stored data can have at least N−1 empty data tracks therebetween. If the SU % is greater than or equal to TP1, but less than TP2, the OS can store data only to about every N/2 data track between every Nth data track. If the SU % is greater than or equal to TP1, but less than TP2, all data tracks with stored data can have at least (N/2−1) empty data tracks therebetween. If the SU % is greater than or equal to TP2, the OS can store data only to the data tracks between the N/2 data tracks and the Nth data tracks. If the SU % is greater than or equal to TP2, only some data tracks with stored data can have at least 1 empty data track therebetween.

The media disk may further comprise other data tracks (ODTs) located among the data tracks, and data can be stored away from the ODTs in accordance with steps described herein. For example, the ODTs can be read-only data tracks for non-user data storage, and may be configured or located as described elsewhere herein.

Such sequences of data track usage can be beneficial to reduce the effects of ATI and FTI. By recording data to tracks that are not immediately adjacent to each other, the chances of ATI and/or FTI can be reduced. Furthermore, by incorporating sequences that keep recorded data tracks as far apart as possible, given selected levels of usage, the chances of ATI and/or FTI are further mitigated until it becomes necessary to store data to adjacent data tracks. Thus, the embodiments disclosed herein can enable more reliable and consistent data storage.

This written description uses examples to disclose the embodiments, including the best mode, and also to enable those of ordinary skill in the art to make and use the invention. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A method of storing data in a hard disk drive (HDD), comprising:
   (a) providing a media disk with a plurality of data tracks;
   (b) determining a percentage of storage usage (SU %) of the data tracks;
   (c) wherein, if the SU % is less than a first threshold percentage (TP1), storing data to at least some Nth data tracks;
   (d) wherein, if the SU % is greater than or equal to TP1, but less than a second threshold percentage (TP2), storing data to at least some N/2 data tracks between said Nth data tracks;
   (e) wherein, if the SU % is greater than or equal to TP2, storing data to data tracks between said N/2 data tracks and said Nth data tracks.

2. The method of claim 1, wherein the data tracks are those limited to user data storage, and SU % is the percentage of usage of user-stored data stored in the data tracks limited to user data storage.

3. The method of claim 1, wherein, if the SU % is less than TP1, storing data only to every Nth data track.

4. The method of claim 1, wherein, if the SU % is less than TP1, all data tracks with stored data have at least N−1 empty data tracks therebetween.

5. The method of claim 1, wherein, if the SU % is greater than or equal to TP1, but less than TP2, storing data only to about every N/2 data track between every Nth data track.

6. The method of claim 1, wherein, if the SU % is greater than or equal to TP1, but less than TP2, all data tracks with stored data have at least (N/2−1) empty data tracks therebetween.

7. The method of claim 1, wherein, if the SU % is greater than or equal to TP2, storing data only to the data tracks between the N/2 data tracks and the Nth data tracks.

8. The method of claim 1, wherein, if the SU % is greater than or equal to TP2, only some data tracks with stored data have at least 1 empty data track therebetween.

9. The method of claim 1, wherein the media disk further comprises other data tracks (ODTs) located among the data tracks, and data is stored away from the ODTs in accordance with steps (b)-(e).

10. The method of claim 9, wherein the ODTs are read-only data tracks for non-user data storage.

11. The method of claim 9, wherein the ODTs are located adjacent an outer perimeter of the media disk.

12. A method of storing user-stored data in a hard disk drive (HDD), comprising:
   (a) providing a media disk with a rotational axis and a plurality of data tracks in a radial array with respect to the rotational axis, the data tracks having a range of user storage usage from 0% to 100%;
   (b) determining a percentage of user storage usage (SU %) of the data tracks in the range of user storage usage;
   (c) wherein, if the SU % is less than about 25%, storing user data to at least some fourth data tracks in the radial array;
   (d) wherein, if the SU % is greater than or equal to about 25%, but less than about 50%, storing user data to at least some second data tracks between said fourth data tracks in the radial array; and
   (e) wherein, if the SU % is greater than or equal to about 50%, storing user data to data tracks between said second data tracks and said fourth data tracks in the radial array.

13. The method of claim 12, wherein, if the percentage of user storage usage is less than about 25%, storing user data only to every fourth data track in the radial array.

14. The method of claim 12, wherein, if the percentage of user storage usage is less than about 25%, all data tracks with user stored data have at least 3 empty data tracks therebetween.

15. The method of claim 12, wherein, if the percentage of user storage usage is greater than or equal to about 25%, but less than about 50%, storing user data only to every second data track between every fourth data track in the radial array.

16. The method of claim 12, wherein, if the percentage of user storage usage is greater than or equal to about 25%, but less than about 50%, all data tracks with user stored data have at least 1 empty data track therebetween.

17. The method of claim 12, wherein, if the percentage of user storage usage is greater than or equal to about 50%, storing user data only to the data tracks between the second data tracks and the fourth data tracks in the radial array.

18. The method of claim 12, wherein, if the percentage of user storage usage is greater than or equal to about 50%, such that only some data tracks with user stored data have at least 1 empty data track therebetween.

19. The method of claim 12, wherein, if the percentage of user storage usage is less than about 20%, storing user data only to every fifth data track in the radial array, such that all data tracks with user stored data have at least 4 empty data tracks therebetween.

20. A system for controlling data storage in a hard disk drive (HDD), comprising:
   an enclosure;
   a media disk rotatably mounted to the enclosure, the media disk having data tracks for storing data;

an actuator movably mounted to the enclosure and having a slider for reading data from and writing data to the data tracks;

an operating system (OS) for controlling the HDD, wherein the OS:

determines a percentage of storage usage (SU %) of the data tracks;

wherein, if the SU % is less than a first threshold percentage (TP1), the OS stores data to at least some Nth data tracks;

wherein, if the SU % is greater than or equal to TP1, but less than a second threshold percentage (TP2), the OS stores data to at least some N/2 data tracks between said Nth data tracks;

wherein, if the SU % is greater than or equal to TP2, the OS stores data to data tracks between said about N/2 data tracks and said Nth data tracks.

21. The system of claim 20, wherein the data tracks are those limited to user data storage, and SU % is the percentage of usage of user-stored data stored in the data tracks limited to user data storage.

22. The system of claim 20, wherein, if the SU % is less than TP1, the OS stores data only to every Nth data track.

23. The system of claim 20, wherein, if the SU % is less than TP1, all data tracks with stored data have at least N−1 empty data tracks therebetween.

24. The system of claim 20, wherein, if the SU % is greater than or equal to TP1, but less than TP2, the OS stores data only to about every N/2 data track between every Nth data track.

25. The system of claim 20, wherein, if the SU % is greater than or equal to TP1, but less than TP2, all data tracks with stored data have at least (N/2−1) empty data tracks therebetween.

26. The system of claim 20, wherein, if the SU % is greater than or equal to TP2, the OS stores data only to the data tracks between the N/2 data tracks and the Nth data tracks.

27. The system of claim 20, wherein, if the SU % is greater than or equal to TP2, only some data tracks with stored data have at least 1 empty data track therebetween.

28. The system of claim 20, wherein the media disk further comprises other data tracks (ODTs) located among the data tracks, and data is stored away from the ODTs in accordance with steps (b)-(e).

29. The method of claim 28, wherein the ODTs are read-only data tracks for non-user data storage.

30. The method of claim 28, wherein the ODTs are located adjacent an outer perimeter of the media disk.

* * * * *